United States Patent
Faller et al.

(10) Patent No.: US 11,148,650 B2
(45) Date of Patent: Oct. 19, 2021

(54) PNEUMATIC BRAKE BOOSTER HAVING A SEALING ELEMENT

(71) Applicant: Continental Teves AG & Co. oHG, Frankfurt am Main (DE)

(72) Inventors: Jürgen Faller, Kahl (DE); Ralf Jakobi, Flörsheim (DE)

(73) Assignee: Continental Teves AG & Co. oHG

( * ) Notice: Subject to any disclaimer, the term of this patent is extended or adjusted under 35 U.S.C. 154(b) by 0 days.

(21) Appl. No.: 16/463,015

(22) PCT Filed: Nov. 17, 2017

(86) PCT No.: PCT/EP2017/079591
§ 371 (c)(1),
(2) Date: May 22, 2019

(87) PCT Pub. No.: WO2018/104031
PCT Pub. Date: Jun. 14, 2018

(65) Prior Publication Data
US 2019/0322260 A1    Oct. 24, 2019

(30) Foreign Application Priority Data
Dec. 8, 2016   (DE) .......................... 10 2016 224 490

(51) Int. Cl.
*B60T 13/56*    (2006.01)
*B60T 13/567*   (2006.01)
*B60T 13/569*   (2006.01)

(52) U.S. Cl.
CPC .......... *B60T 13/569* (2013.01); *B60T 13/56* (2013.01); *B60T 13/567* (2013.01); *B60Y 2400/81* (2013.01)

(58) Field of Classification Search
CPC ...... B60T 13/569; B60T 13/56; B60T 13/567; B60Y 2400/81
(Continued)

(56) References Cited

U.S. PATENT DOCUMENTS

| 4,596,178 A | 6/1986 | Sugiura |
| 5,025,709 A * | 6/1991 | Miyazaki .............. B60T 13/563 403/13 |

(Continued)

FOREIGN PATENT DOCUMENTS

| CN | 1613702 A | 5/2005 |
| CN | 101746368 A | 6/2010 |

(Continued)

OTHER PUBLICATIONS

German Search Report for German Application No. 10 2016 224 490.6, with partial translation, dated Oct. 25, 2017—9 pages.

(Continued)

*Primary Examiner* — Abiy Teka
*Assistant Examiner* — Daniel S Collins
(74) *Attorney, Agent, or Firm* — RatnerPrestia

(57) ABSTRACT

A pneumatic brake booster having a booster housing. The booster housing has at least two thin-walled shell elements and an elastomer sealing element. The sealing element has a sealing bead, which is of encircling form radially at the outside, and at least one rolling diaphragm portion which adjoins the sealing bead. The sealing bead is sealingly clamped in a clamping space between the shell elements. The clamping space is formed by walls which are generated in the shell elements by deformation, its radial inner wall formed by a tubular, axially forwardly extending projection, which is folded at its front edge, of the second shell element. It is proposed that a bead-side rear wall of the clamping space is formed by an encircling, radially outwardly projecting collar which is formed on the second shell element.

8 Claims, 2 Drawing Sheets

(58) Field of Classification Search
USPC .......................................................... 60/547.1
See application file for complete search history.

(56) References Cited

U.S. PATENT DOCUMENTS

| | | | |
|---|---|---|---|
| 5,297,471 A | | 3/1994 | Boehm et al. |
| 5,771,773 A | | 6/1998 | Sakamoto et al. |
| 5,941,610 A | | 8/1999 | Hayashi et al. |
| 6,003,425 A | * | 12/1999 | Uyama ................. B60T 13/569 91/369.2 |
| 6,390,567 B1 | * | 5/2002 | Hurlbutt ............... B60T 13/567 29/516 |
| 7,048,342 B1 | | 5/2006 | Hurlbutt |
| 70,805,351 | | 7/2006 | Tsubouchi et al. |
| 7,938,056 B2 | | 5/2011 | Faller et al. |
| 8,631,735 B2 | | 1/2014 | Nakamura et al. |
| 2005/0092170 A1 | | 5/2005 | Hewitt et al. |
| 2016/0339892 A1 | | 11/2016 | Berthomieu |

FOREIGN PATENT DOCUMENTS

| | | |
|---|---|---|
| CN | 201553139 U | 8/2010 |
| DE | 3942211 A1 | 6/1991 |
| DE | 19626808 A1 | 1/1997 |
| DE | 19703407 A1 | 11/1997 |
| DE | 10334457 A1 | 2/2005 |
| DE | 102006011414 A1 | 11/2006 |
| DE | 102005061353 A1 | 1/2007 |
| DE | 102012208866 A1 | 11/2012 |
| GB | 2082276 A | 3/1982 |
| GB | 2112105 A | 7/1983 |
| GB | 2328991 A | 3/1999 |
| JP | 2013252787 A | 12/2013 |

OTHER PUBLICATIONS

International Search Report and Written Opinion for International Application No. PCT/EP2017/079591, dated Jan. 25, 2018—8 pages.
Chinese Office Action for Chinese Application No. 201780075002.9, dated Nov. 23, 2020 with partial translation, 9 pages.
Korean Notice of Grounds for Rejection for Korean Application 10-2019-7016131, dated Jun. 3, 2020, with translation, 16 pages.

* cited by examiner

A - A

A-A

A-A

PNEUMATIC BRAKE BOOSTER HAVING A SEALING ELEMENT

CROSS REFERENCE TO RELATED APPLICATIONS

This application is the U.S. National Phase Application of PCT International Application No. PCT/EP2017/079591, filed Nov. 17, 2017, which claims priority to German Patent Application No. 10 2016 224 490.6, filed Dec. 8, 2016, the contents of such applications being incorporated by reference herein.

FIELD OF THE INVENTION

The invention relates to a pneumatic brake booster in particular for a hydraulic motor vehicle brake system.

BACKGROUND OF THE INVENTION

Brake boosters of this type are widely used and known. The booster housing of a brake booster of said type normally has at least two thin-walled shell elements which are connected to one another or fixed or coupled to one another. Here, in the booster housing, at least one negative-pressure chamber is pneumatically separated from a working chamber by a sealing element composed of elastomer material. Because the sealing element is moved axially over relatively long distances during operation, said sealing element has, normally radially at the outside, a rolling diaphragm portion, on the radial outer edge of which a sealing bead is integrally formed. Said sealing bead is clamped between the shell elements of the booster housing and a sealing seat—a type of clamping space, the walls of which are formed by a special shaping of the shell elements.

For a permanently reliable seal, it is for example necessary to take precautions to ensure that the moving rolling diaphragm portion is not damaged on sharp edges either during assembly or during operation, that the sealing bead is prevented from slipping out during operation, so-called detachment, and the shell elements can at the same time be produced, and connected to one another, as easily and reliably as possible. Furthermore, permanent corrosion prevention is of major importance.

JP 2013252787 A, incorporated herein by reference, has disclosed a generic brake booster. The radial inner wall of its clamping space is formed by a tubular projection of a shell element. Here, the projection is, at its front edge facing toward the rolling diaphragm portion, folded and thus of rounded design, whereby reliable protection of the rolling diaphragm portion against cutting is provided. The connection of the shell elements is however realized with a cumbersome multi-stage cascade of radial shoulders and collars, which engage into one another, on the two shell elements, which increase the outlay in terms of production, the weight and the material consumption. Furthermore, for the fixing of the shell elements, punched-out holding claws are used, whereby the corrosion prevention layer is certainly damaged.

SUMMARY OF THE INVENTION

An aspect of the invention is a brake booster which is optimized in terms of production and assembly and in the case of which the sealing element can be securely and permanently reliably received.

BRIEF DESCRIPTION OF THE DRAWINGS

The details and advantages of aspects of the invention will be explained in more detail hereunder by means of descriptions of the figures. In this context, the description of generally known aspects and functions of a brake booster of the generic type will be largely dispensed with, and only the details which are relevant to aspects of the invention will be discussed.

In detail.

DETAILED DESCRIPTION OF THE PREFERRED EMBODIMENTS

FIG. 1

Figure 1:
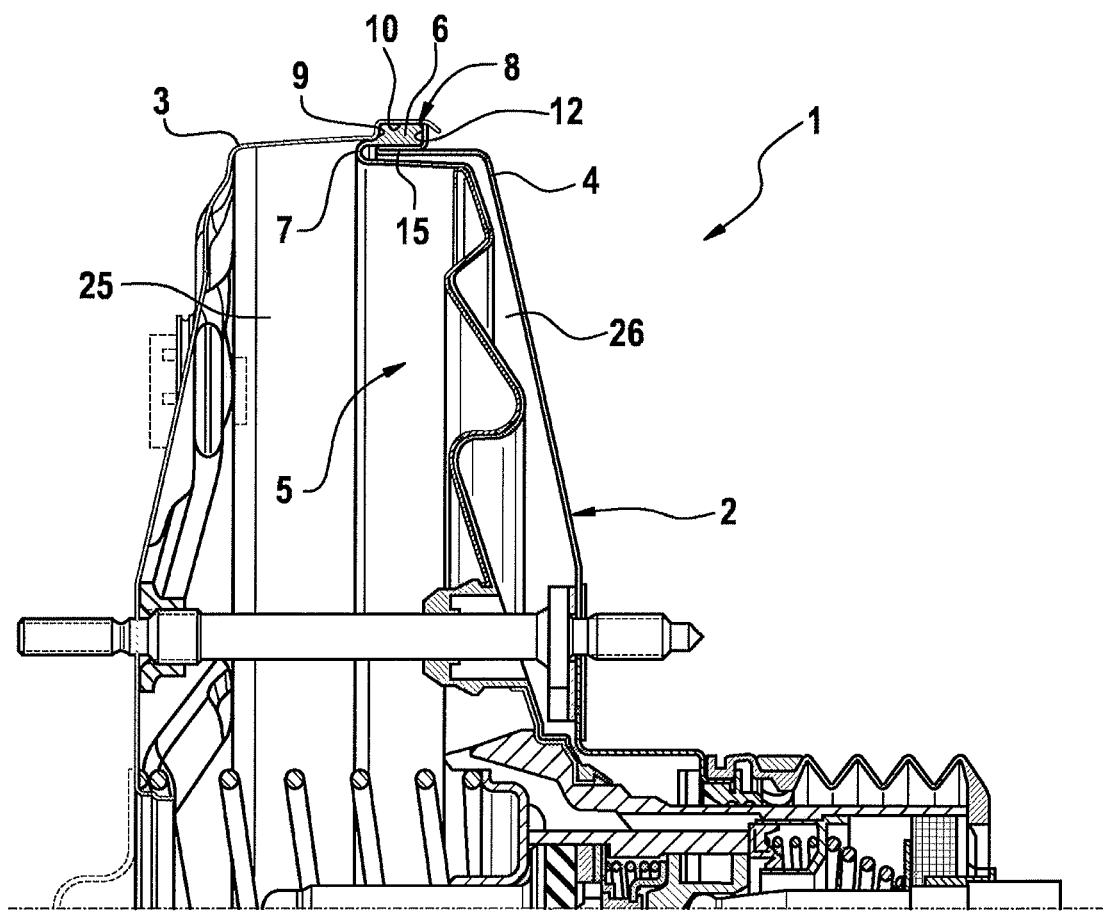
FIG. 1 shows by way of example an axial sectional illustration of an embodiment of the brake booster according to an aspect of the invention.
Figure 2:
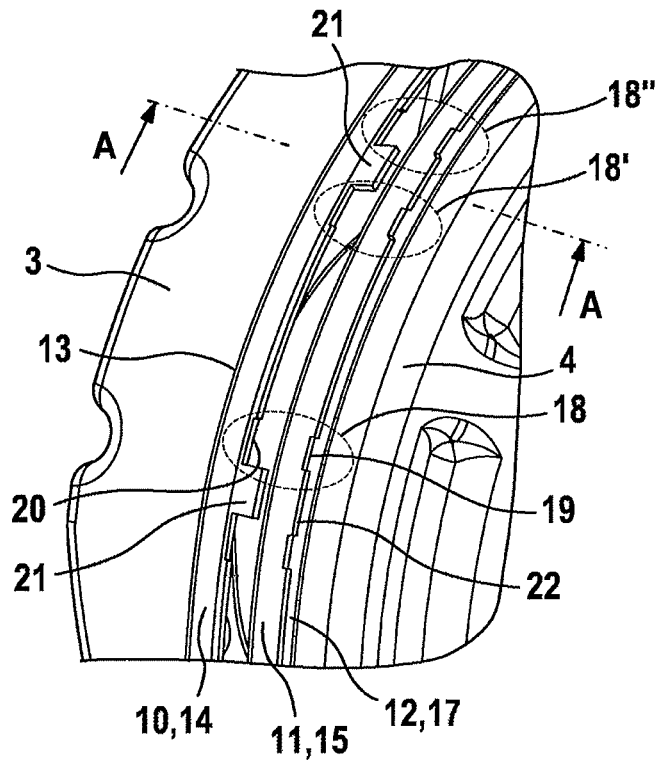
FIG. 2 shows a partial view of two shell elements, which have not yet been connected to one another, in a three-dimensional exploded illustration.

A pneumatic brake booster 1 has a thin-walled booster housing 2. The booster housing 2 comprises shell elements 3 and 4, which are connected to one another in their radial outer region.

The boost force is generated in the pneumatic brake booster 1 by means of the pressure difference between a negative-pressure chamber 25 and a working chamber 26.

The negative-pressure chamber 25 is pneumatically delimited with respect to the working chamber 26 by an elastomer sealing element 5 which, during operation, is moved axially in the booster housing 2. For compensation of the movement of the sealing element 5, the latter has a rolling diaphragm portion 7, on which, at the radial outer edge thereof, there is integrally formed an encircling sealing bead 6.

The sealing bead 6 serves firstly for sealing off the interior space of the booster housing 2 with respect to the surroundings, and secondly for fastening the sealing element 5 to the booster housing 2. The sealing bead 6 is clamped with pneumatically sealing action in a clamping space 8 between the shell elements 3 and 4. The clamping space 8 is formed during the placement of the two shell elements 3 and 4 onto one another, owing to the special shaping thereof generated by deformation, and said clamping space is delimited by walls 9, 10, 11, 12, the nature of which will be discussed below, in particular in FIG. 3.

FIG. 2

In order to reliably establish a uniquely defined position of the shell elements 3 and 4 for the assembly process, multiple positive locking portions 18 are provided on shell elements 3 and 4 so as to be distributed over the circumference.

In each positive locking portion 18, positive locking is formed between the shell elements 3 and 4 by way of a lug 19 which is positioned in a corresponding recess 20. In this way, the positive locking acts simultaneously both in a circumferential direction and axially in the direction of the two shells 3 and 4 with respect to one another.

In the exemplary embodiment shown, the lug 19 is formed on a radially outwardly projecting and circling collar 17 which is formed on the shell element 4.

The recess (20) is arranged in a tubular projection 14 which extends from a radially encircling shoulder 13 on the shell element 3 axially substantially in the direction of the shell element 4.

A reversed or alternating arrangement of lug 19 and recess 20 are likewise admissible within an aspect of the invention.

The positive locking portions 18, 18', 18", ... may, within an aspect of the invention, be arranged so as to be distributed in both regular and irregular fashion on the circumference of the shell elements 3 and 4. In the case of an irregular circumferential distribution, a defined relative rotational position of the two shell elements 3 and 4 with respect to one another can be particularly easily coded and positively produced in error-free fashion.

In order to fix the shell elements 3 and 4 to one another as easily as possible, and in order that a superficial corrosion prevention layer that may possibly be present is not damaged in the process, axially forwardly extending bending tabs 21 are provided on the projection 14. The bending tabs 21 are folded over or bent about the radial outer edge 22 of the collar 17 after the joining-together of the shell elements 3 and 4. Here, for operationally reliable fixing, the bend angle may amount to considerably less than 90° and possibly even less than 45°, whereby cracking of a superficial corrosion prevention layer can be avoided.

FIG. 3

Figure 3:
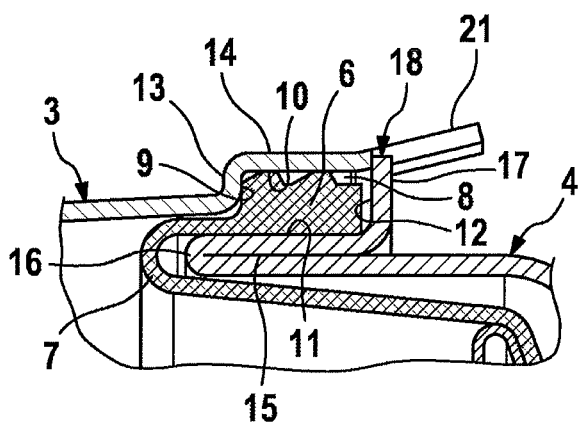
FIG. 3 shows an enlarged sectional view of the clamping space as per the embodiment in FIG. 1 with a bending tab which has not yet been folded over.
Figure 4:
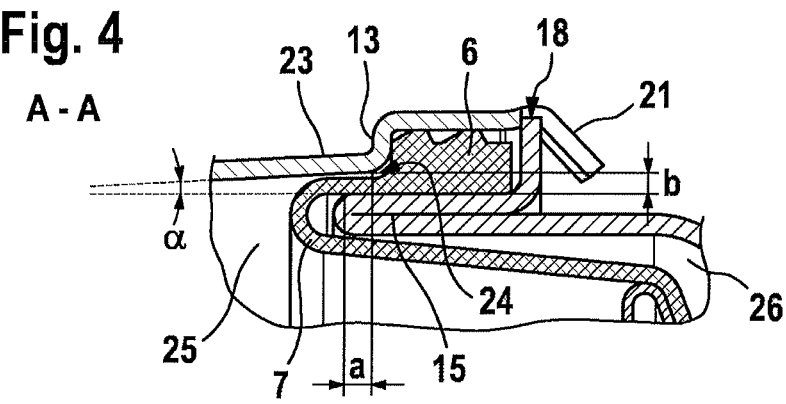
FIG. 4 shows an enlarged sectional view of the clamping space as per the embodiment in FIG. 1 with a bending tab after final assembly, with a folded-over bending tab.

FIG. 3 illustrates the construction of the clamping space 8 as per the embodiment in FIG. 1 in an enlarged sectional illustration.

The clamping space 8 is delimited substantially by four walls 9, 10, 11, 12, which themselves are formed by form elements of the shell elements 3 and 4.

A rolling-diaphragm-side end wall 9 of the clamping space 8 is formed by an encircling radial shoulder 13 of the shell element 3.

A radial outer wall 10 is formed by a tubular projection 14 which extends from the shoulder 13 substantially in an axial direction and on which, furthermore, the bending tabs 21 are integrally formed.

A radial inner wall 11 is formed by a tubular, axially forwardly extending axial projection 15 of the second shell element 4. The projection 15 is of folded design at its front edge 16, such that the front edge 16 is rounded and the projection 15 has twice the wall thickness of the shell element 4.

A bead-side rear wall 12 of the clamping space 8 is formed by an encircling, radially outwardly projecting collar 17, which is formed on the second half-shell 4 and which directly adjoins the projection 15.

FIG. 4

During booster operation, the rolling diaphragm portion 7 is pulled in the direction of the negative-pressure chamber 25 by the pressure difference, whereby the sealing bead 6 seeks to slip out of the clamping space 8 into the interior of the booster housing 2.

To prevent the sealing bead 6 from slipping out, the rolling diaphragm portion 7 is guided through a narrow annular gap 24, the radial gap dimension b of which is considerably narrower than the thickness of the sealing bead 6.

In the preferred embodiment that is shown, the annular gap 24 is, in cross section, of not parallel but rather approximately conical form, and widens in the direction of the clamping space 8. In the embodiment shown, this is achieved by virtue of a wall region 23, positioned directly in front of the shoulder 13, of the shell element 3 being of substantially conical or cone-shaped design with the cone angle α>1°.

Furthermore, the axial extent a of the annular gap 24 should be at least equal to and preferably at least twice as great as its radial gap dimension b as measured at or in front of its opening into the clamping space 8 or in front of the rending of the transition to the shoulder 13.

By means of such a conical or funnel-shaped cross-sectional profile of the annular gap 24, it is firstly prevented that the sealing element is damaged, for example torn, during operation at the transition from the rolling diaphragm portion 7 into the sealing bead 6, because the load from the rolling diaphragm portion 7 can distribute more uniformly over a greater volume of the sealing bead 6. Secondly, it is prevented that the sealing bead 6, in the presence of particularly high loads on the rolling diaphragm portion 7, is partially pulled into the annular gap 24 and remains clamped there, because the present oblique wall geometry promotes the build-up of axially directed components of reaction forces during compression of the sealing bead 6, and thus assists the decompression thereof in the direction of the clamping chamber 8 after load abatement.

LIST OF REFERENCE DESIGNATIONS

1 Brake booster
2 Booster housing
3 Housing shell
4 Housing shell
5 Sealing element
6 Sealing bead
7 Rolling diaphragm portion
8 Clamping space
9 End wall
10 Outer wall
11 Inner wall
12 Rear wall
13 Shoulder
14 Projection
15 Projection
16 Front edge
17 Collar
18 Positive locking portion
19 Lug
20 Recess
21 Bending tab
22 Outer edge
23 Wall region
24 Annular gap
25 Vacuum chamber
26 Working chamber
a Axial extent
b Radial gap dimension
α Cone angle

The invention claimed is:

1. A pneumatic brake booster having a booster housing, wherein the booster housing has at least two thin-walled shell elements and an elastomer sealing element, wherein the sealing element has a sealing bead, which is of encircling form radially at the outside, and at least one rolling diaphragm portion which adjoins the sealing bead, and the sealing bead is sealingly clamped in a clamping space between the shell elements, wherein the clamping space is formed by walls which are generated in the shell elements by deformation, wherein a rolling-diaphragm-side end wall of the clamping space is formed by an encircling radial shoulder of the first shell element, a radial outer wall is formed by a tubular projection which extends from the shoulder substantially in an axial direction, a radial inner wall is formed by a tubular, axially forwardly extending projection, which is folded at its front edge, of the second shell element, wherein a bead-side rear wall of the clamping space is formed by an encircling, radially outwardly projecting collar which is formed on the second shell element, at least one positive locking portion is provided between the rear wall and the outer wall of the clamping space, said positive locking portion acting in the circumferential direction and axially in the direction of the sealing bead, and the shell elements are fixed to one another by bending tabs, the bending tabs formed on the projection so as to extend axially forwardly and being bent toward the second shell element at a radial outer edge of the collar.

2. The brake booster as claimed in claim 1, wherein the positive locking in the positive locking portion is formed by at least one lug on one of the shell elements which engages into a corresponding recess in the other shell element.

3. The brake booster as claimed in claim 2, wherein the lug is formed on the collar and the recess is formed on the projection.

4. The brake booster as claimed in claim 1, wherein multiple positive locking portions are arranged so as to be distributed on the circumference of the shell elements.

5. A pneumatic brake booster having a booster housing, wherein the booster housing has at least two thin-walled shell elements and an elastomer sealing element, wherein the sealing element has a sealing bead, which is of encircling form radially at the outside, and at least one rolling diaphragm portion which adjoins the sealing bead, and the sealing bead is sealingly clamped in a clamping space between the shell elements, wherein the clamping space is formed by walls which are generated in the shell elements by deformation, wherein a rolling-diaphragm-side end wall of the clamping space is formed by an encircling radial shoulder of the first shell element, a radial outer wall is formed by a tubular projection which extends from the shoulder substantially in an axial direction, a radial inner wall is formed by a tubular, axially forwardly extending projection, which is folded at its front edge, of the second shell element, wherein a bead-side rear wall of the clamping space is formed by an encircling, radially outwardly projecting collar which is formed on the second shell element, wherein, between the rear wall and the outer wall of the clamping space, there are provided multiple positive locking portions which act in the circumferential direction and axially in the direction of the sealing bead, and wherein the multiple positive locking portions are arranged so as to be distributed in irregular fashion on the circumference of the shell elements.

6. A pneumatic brake booster having a booster housing, wherein the booster housing has at least two thin-walled shell elements and an elastomer sealing element, wherein the sealing element has a sealing bead, which is of encircling form radially at the outside, and at least one rolling diaphragm portion which adjoins the sealing bead, and the sealing bead is sealingly clamped in a clamping space between the shell elements, wherein the clamping space is formed by walls which are generated in the shell elements by deformation, wherein a rolling-diaphragm-side end wall of the clamping space is formed by an encircling radial shoulder of the first shell element, a radial outer wall is formed by a tubular projection which extends from the shoulder substantially in an axial direction, a radial inner wall is formed by a tubular, axially forwardly extending projection, which is folded at its front edge, of the second shell element, wherein a bead-side rear wall of the clamping space is formed by an encircling, radially outwardly projecting collar which is formed on the second shell element, wherein, between the projection and a wall region, which axially adjoins the shoulder, of the shell element, there is arranged an annular gap through which a region of the rolling diaphragm portion runs, wherein the wall region is of conical form in the region of the annular gap.

7. The brake booster as claimed in claim 6, wherein an axial extent of the annular gap is at least as large as its radial gap dimension at the opening into the clamping space.

8. The brake booster as claimed in claim 6, wherein an axial extent of the annular gap is twice as large as its radial gap dimension at the opening into the clamping space.

* * * * *